(12) United States Patent
Coleman (10) Patent No.: US 8,022,835 B2
(45) Date of Patent: Sep. 20, 2011

(54) OPTIC SYSTEM USING SPECTRAL CHARACTER SHIFT FOR COMMUNICATION BETWEEN OPTIC INPUT DEVICES AND READER DEVICES FOR CONTROL SYSTEMS AND SENSORS FOR PRESSURE, FORCE, DISPLACEMENT, OR CHEMICAL CONDITION

(76) Inventor: Nathan John Coleman, Murrieta, CA (US)

( * ) Notice: Subject to any disclaimer, the term of this patent is extended or adjusted under 35 U.S.C. 154(b) by 183 days.

(21) Appl. No.: 11/256,890

(22) Filed: Oct. 24, 2005

(65) Prior Publication Data

US 2007/0090281 A1 Apr. 26, 2007

(51) Int. Cl.
- G08B 21/00 (2006.01)
- G08B 13/18 (2006.01)
- G01B 9/02 (2006.01)
- G01J 5/08 (2006.01)
- G02B 1/10 (2006.01)

(52) U.S. Cl. ............... 340/686.6; 340/508; 340/555; 340/600; 359/583; 359/629; 359/638; 356/479; 356/480; 356/334; 250/227.12; 250/227.19; 385/10

(58) Field of Classification Search ............... 340/686.6
See application file for complete search history.

(56) References Cited

U.S. PATENT DOCUMENTS

| | | | | |
|---|---|---|---|---|
| 4,933,545 A | * | 6/1990 | Saaski et al. | 250/227.14 |
| 4,986,671 A | * | 1/1991 | Sun et al. | 374/131 |
| 5,065,010 A | | 11/1991 | Knute | |
| 6,604,427 B1 | | 8/2003 | Coleman | |
| 2004/0104336 A1 | * | 6/2004 | Melnyk et al. | 250/227.14 |

* cited by examiner

Primary Examiner — Donnie Crosland
(74) Attorney, Agent, or Firm — Aexius LLC; Michael A. Long, Esq.

(57) ABSTRACT

An improved optic system for measuring and/or controlling displacement, force, pressure, position, or chemistry is disclosed. This apparatus allows for more accurate, robust, and economical communication between the transducer (or control input element) and the reader device (or control output), allows the use of a single optic fiber and/or or a gap for the communication link, and produces substantial insensitivity to attenuation due to mechanical, chemical, thermal, and radiation effects acting on the optic fiber or open space in which the signal propagates. It is also significantly immune to interference from electromagnetic radiation, since the link can be easily produced as a non-conductor which will not propagate unwanted electrical energy or lightning, and is intrinsically safe from igniting fires or explosions. It also facilitates use on rotating machinery and remote location of the transducer by the ability to transmit the signal across a large gap or air space.

29 Claims, 9 Drawing Sheets

FIGURE 5.
SECTION A-A

DETAIL E
FIGURE 6.

FIGURE 9.   SECTION A-A OF FIG. 8

FIGURE 12.
SECTION A-A

DETAIL E
FIGURE 13.

OPTIC SYSTEM USING SPECTRAL CHARACTER SHIFT FOR COMMUNICATION BETWEEN OPTIC INPUT DEVICES AND READER DEVICES FOR CONTROL SYSTEMS AND SENSORS FOR PRESSURE, FORCE, DISPLACEMENT, OR CHEMICAL CONDITION

STATEMENT REGARDING FEDERALLY SPONSORED RESEARCH OR DEVELOPMENT

No Federal sponsorship was received for this invention.

BACKGROUND OF THE INVENTION

1. Field of the Invention

The invention relates generally to the field of instrumentation and control, especially to areas where the intrinsic fire/explosion safety, immunity to electrical disturbances, immunity to eavesdropping and ability to propagate a signal through air or empty space of the present invention are features which are desirable VS conductor wires, strain gauge or capacitance diaphragm based devices and current optic based devices.

2. Description of Related Art

Devices for sensing and/or controlling weight, force, displacement, position, and chemistry are common in everyday life and commerce. Communication in the form of electric signals carried in wires or light signals carried in optic fibers are commonplace and well known.

A well known application of electronic controls translating a deliberate input from an operator or pilot into an output quantity would be the "fly by wire" systems developed for aircraft where a small, low force displacement of a lever by the pilot is translated via wires to a machine powered by the craft's electric or hydraulic system to create a large, forceful displacement of an aerodynamic control surface, replacing the earlier, more limited systems relying on the strength of the pilot to directly place the aerodynamic control surface via cables or hydraulics.

Systems which measure a physical quantity and are constructed of an excitation device, sometimes referred to as a signal conditioner, which powers it's transducer, and a transducer which converts a physical quantity such as pressure, position, force, or chemical condition into an electric or optic signal, and a communication link consisting of a wire or an optic fiber to transmit the excitation energy to the transducer and to transmit the signal from the transducer to a reader device, and a reader device which converts the signal to a display or indicator position expressing the quantity being measured in some number of units or which communicate with other equipment for reporting, process monitoring or control are known. A common example of such an electronic device is the well known strain gauge scale or strain gauge pressure sensor which provides electrical power to a Wheatstone bridge, the output of which is a predictable function of the strain experienced by the gauge elements, usually expressed in millivolts of output voltage per volt of input voltage per unit of strain or microstrain. These electronic devices are all vulnerable to the effects of interference from stray or deliberate electromagnetic energy, thus reducing accuracy or destroying the device. To avoid these problems shielding is often employed which increases weigh, size, and cost and decreases flexibility. These electronic gauges also present the danger of their own electric signals facilitating eavesdropping or unintentionally igniting flammables and explosives. Optic devices are known to solve some of these issues such as the Knute device of U.S. Pat. No. 5,065,010 which uses a reader/generator which communicates via an optic link of four separate fibers; two outgoing (one each "signal" and "reference") and two return (one each "signal and "reference") to and from a transducer which is exposed to an environment to measure some quantity, in this case pressure. Notably, this device would be vulnerable to inaccuracies due to any physical phenomena that affect any one, two, or three of those fibers in a manner not exactly equal to the others. A single fiber device would offer advantages in accuracy, robustness, economy, and miniaturization over a multi-fiber device. Further, if using a multi-fiber design such as Knute's or any similar analog system which converts light intensity into output in units being measured is employed in a disposable or replaceable device, then the transducer, fiber optic link, and optic emitting and receiving elements must all be part of the disposable or replacement component and then interface to the "reader" via electrical connections, thus adding cost. This type of connection is necessary for accuracy in that type of device due the unpredictable attenuation of signal whenever an optic fiber connection is made. There is also no ability in the Knute device for the reader or conditioning device to observe the transducer output through a gap or from a distance.

Another type of well known sensor device is the capacitance diaphragm gauge. This device uses the deflection of a conductive diaphragm which reacts to pressure. The device is constructed such that the position of the diaphragm relative to a fixed electrode is used to measure pressure as a function of the capacitance between the reactive and fixed elements. This sort of device has limitations in part because it is electronic and subject to interference and other aforementioned problems with electronic transducers, and as importantly, it has sensitivity issues at low absolute pressures. One intrinsic limitation of the capacitance based device is that there is a point where the electrical excitation of the capacitor begins to significantly influence the position of the reactive diaphragm. This is an issue which is avoided entirely by using light to detect position of the reactive element.

BRIEF SUMMARY OF THE INVENTION

In light of the aforementioned problems or shortcomings of prior devices, it is an object of the present invention to provide a system which employs a means of communication between a pressure, force, displacement, or chemical condition transducer and it's reader or between a control input and a corresponding control output that is immune to electronic interference, is intrinsically safe in flammable and explosive environments, has the ability to transmit across a gap, can be produced with a disposable transducer and a disposable communication link, determines the condition of the reactive element using a technique which does not exert forces upon the reactive element, and possesses an accuracy which is significantly unaffected by attenuation of the signal. This communication link is achieved by using light instead of either electrical resistance or electrical capacitance, and examining a particular characteristic of the light emanating from the transducer to the reader device instead of measuring simple intensity of light, and by propagating the light signal from the transducer to the reader device in a single optic fiber or through a space. This is accomplished by the device causing the character of the signal emanating from the transducer to shift in a predictable manner as the quantity being measured increases or decreases or causing the character of the signal emanating from the control input to shift in a predictable manner with intentional input by the user. Means offered to affect this involve the emission of two or more components of light or emission of light of a particular character by the transducer or control input device. In this, a "reference channel" of light of a known wavelength, range of wavelengths, color, or timing, which is weakly or relatively unaffected by the active element of the transducer or affected in a predictable manner by the active element and thus by the quantity being measured. At substantially the same time, a "signal channel" of a different wavelength, range of wavelengths, color, or timing is generated in a manner that is strongly affected by the reactive element and thus by quantity being measured in a predictable manner which is different from the aforementioned reference channel. The "signal" and "reference" channels could be distinguishable from each other by some easily separable feature such as wavelength, or the signal could be encoded in the total spectral character of light received at the reader. Another means to distinguish the signal and reference channels is timing features such as length of time of the signal or the point in time in which it occurs. Measurement is affected by examination of the spectral or timing character of the combined light reaching the reader device and comparing signal and reference to each other. Both "signal" and "reference" are generated in close proximity to each other and travel substantially the same length of optic fiber or jump the same gap to the reader device. In this manner, the actual strength of the total light received by the reader device is not especially important to accurate reading so long as the particular wavelengths or timed pulses of the signal and reference light are affected in similar manner by the multitude of phenomena which serve to attenuate power of light carried in an optic fiber, air, open space, or other media in it's propagation from the transducer to the reader device.

BRIEF DESCRIPTION OF THE DRAWINGS

The objects and features of the present invention, which are believed to be novel, are set forth with particularity to the appended claims. The present invention, both as to it's organization and manner of operation, together with further objects and advantages, may be best understood by reference to the following description, taken in connection with the accompanying drawings, of which:

DETAILED DESCRIPTION OF THE PREFERRED EMBODIMENT

Figure 1:
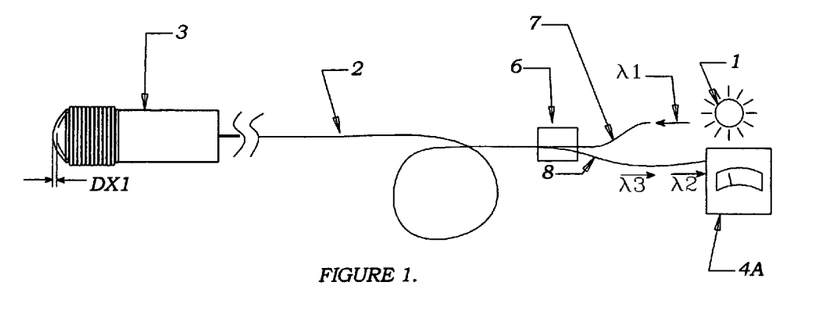
FIG. 1 is a preferred embodiment of the present invention, configured as a pressure, force, or displacement measuring device.

FIG. 1 shows a system configured to measure some displacement DX1 of the distal end of the transducer 43 due to some pressure or force or some imposed displacement. Excitation light is generated at source 41 in with some wavelength or range of wavelengths $\lambda 1$ launched into input optic fiber 47. This light energy propagates past the splitter 46 and continues the length of the optic fiber 42 and into the transducer 43. Once inside the transducer, the incoming light is divided by wavelength or used to generate a florescent response in the form of two or more light signals and returned in part along optic fiber 42, past the splitter 46, causing some of the returning light energy to launch into output optic fiber 48 and continue on into the meter. The construction of the transducer causes the return light to be divided into two or more signals having different spectral character, and which receive different treatment inside the transducer. The light signal shown as $\lambda 2$ is not strongly affected by the degree of displacement DX1 and is used as a reference, however the signal shown as $\lambda 3$ is strongly affected by DX1. Thus as DX1 changes, the ratio of light energy $\lambda 2 : \lambda 3$ changes in a predictable manner. Note FIG. 14 and FIG. 15. These charts show the input power $\lambda 1$ and the output power of the reference channel $\lambda 2$ and signal channel $\lambda 3$ charted against wavelength before ("Condition A") and after (Condition "B") some change in the quantity being measured causing a change in the position of the movable reflector. In the case of a florescent device, the outputs would be known wavelengths longer than then input light and determined by the chemical makeup of the florescent elements. This shows that other things being substantially equal, particularly the input power $\lambda 1$, the reference channel output $\lambda 2$ changes little or any between the "A" condition shown in FIG. 14 and the "B" condition of FIG. 15, however the signal channel $\lambda 3$ changes. In this case, the excitation light $\lambda 1$ is represented to be some discrete wavelength. While this may present advantages it is not absolutely necessary, as the device will function if $\lambda 1$ is some range of wavelengths or even "white light" so long as it serves to excite the florescent media. If the device operates by selective reflectance or filtering, then these wavelengths would need to be present in $\lambda 1$.

This relationship can be used to detect the condition of DX1. The characteristics of the optic fiber and the emission wavelengths are chosen such that they are affected similarly by physical phenomena that would attenuate signal such that both $\lambda 2$ and $\lambda 3$ are affected similarly by all phenomena other than the physical quantity being measured to the greatest extent achievable.

Figure 2:
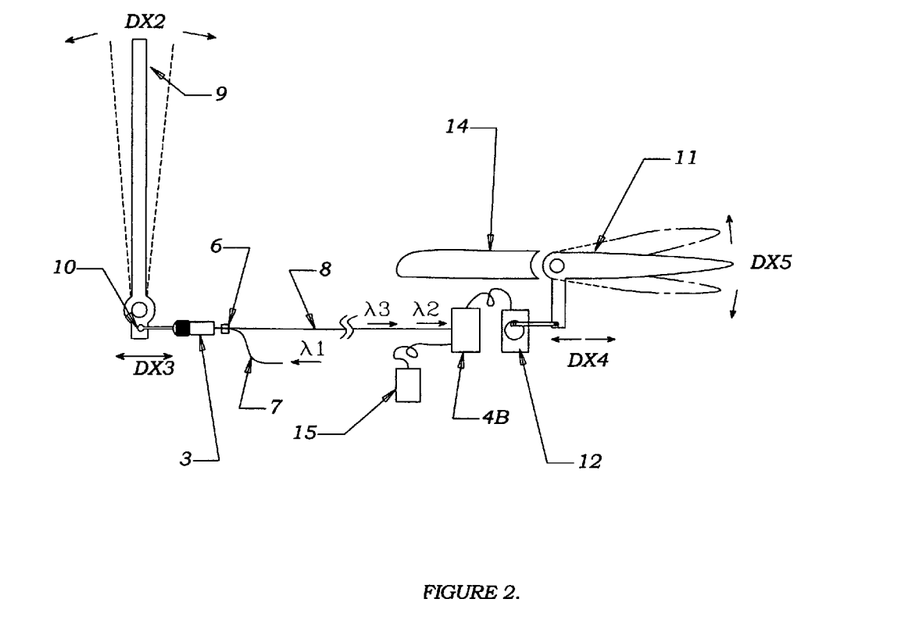
FIG. 2 is a view of a preferred embodiment of the present invention used as a control device to position an aircraft aerodynamic control surface.

FIG. 2 shows a system configured to translate input from a user, driver or pilot, DX2 into an output in the form of placement of a mechanical element, in this case an aerodynamic control surface 51 of a wing 54, which correspondingly moves DX5 in a predictable relationship with DX2. In this instance, the spectral character shift transducer 43 is in a position fixed relative to the system and is thus compelled to deform some amount DX3 due to the control input of DX2. Just as in FIG. 1, some input energy in the form of excitation light $\lambda 1$ is launched into the input optic fiber 47, causing signal and reference waves emerge propagating along output optic fiber 48. The waves of differing spectral character emerging from output optic fiber 48 are resolved in resolver 44B in this case, rather than a meter as in the previous. Power is input from power source 55. The resolver 44B responds to the input by generating an electronic command and supplying a certain power or command to an electromotive or hydraulic device to produce displacement DX4, which results in control output DX5. In this manner a human pilot or operator can control strong mechanical movements quickly, accurately, and with inputs requiring little force. The control circuit from the input to the resolver would be optic and thus immune to electromagnetic interference, eavesdropping, or the possibility of igniting a fire or explosion. The characteristics of the optic fiber and the emission wavelengths are chosen such that $\lambda 2$ and $\lambda 3$ are affected similarly by physical phenomena that would attenuate the signal in such a manner that the information pertaining to the measurement, such as the ratio $\lambda 2:\lambda 3$ is not changed.

Figure 3:
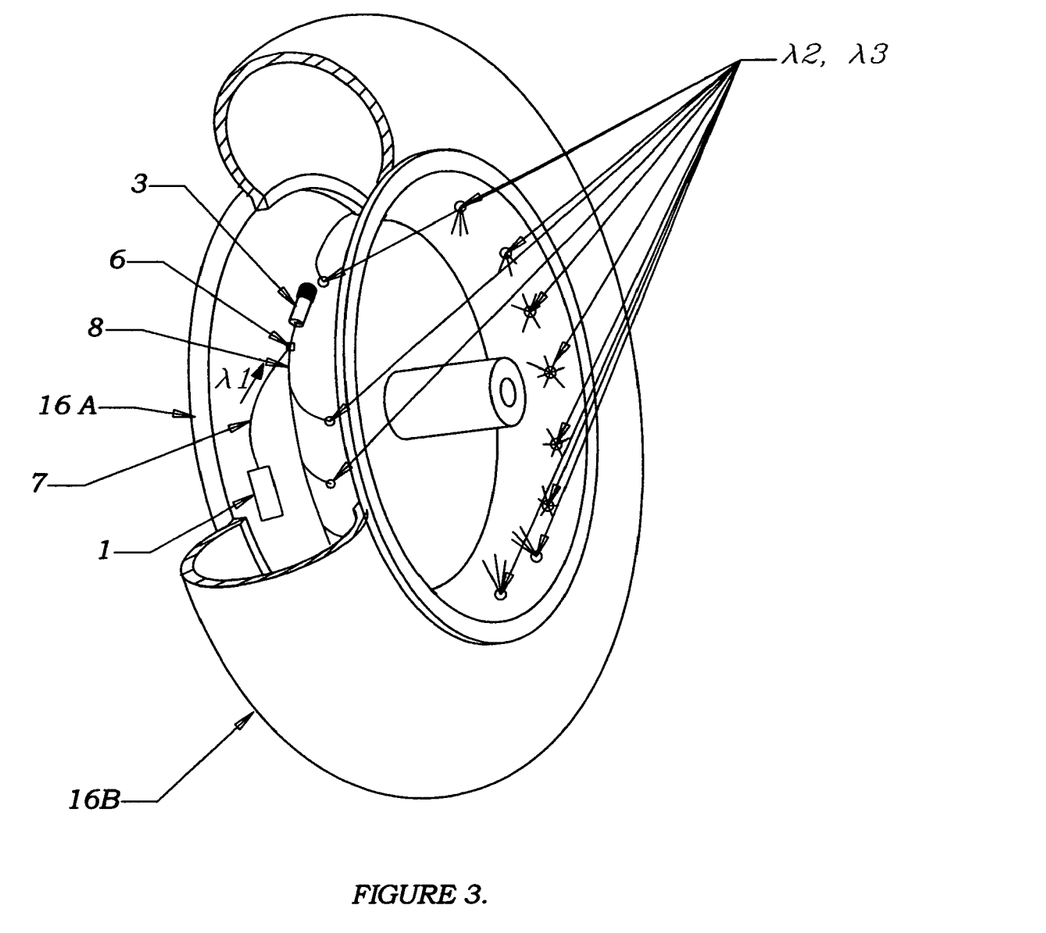
FIG. 3 is a preferred embodiment of the device employed as a gap jumping measuring device for use on rotating machinery.

FIG. 3 shows a representation of the device employed in an application requiring transmission of the signal across a gap or open airspace as would be required by rotating machinery. In this particular case a pressure monitoring application for an aircraft landing gear tire is shown. The tire 56B is shown cut-away to reveal the pressure gauge inside. As it is necessary for the tire to rotate about it's axis, prior art does not afford a means to transmit the optic signal. Current technology using strain gauges to sense condition and/or electromagnetic energy to transmit the information may not be useable due to interference from numerous sources including the use of radar and radio. This device is configured as a pressure sensor with a transducer 43 which is supplied with excitation light or energy $\lambda 1$ by source 41. This energy propagates to the transducer along input 57, which may be an optic fiber or a conducting wire. The signal emanating from the transducer propagates along an optic fiber, or a bundle of optic fibers shown as 48. These optic fibers emit the signal through a port placed in the rim 56A of the landing gear assembly. This port could be constructed air-tight to allow use of tubeless tires. The emitted signal contains the information in the form of a spectral character $\lambda 2:\lambda 3$, which describes the inflation level of the tire.

Figure 4:
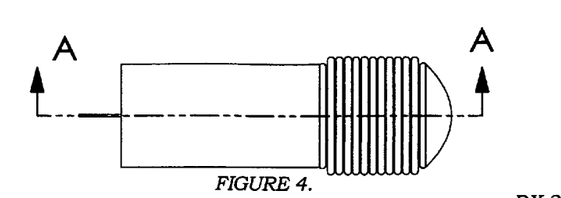
FIG. 4 shows a close view of the transducer of FIG. 1

FIG. 4 shows a possible representation of the end or "transducer" of the system that would be exposed to the quantity to be measured, in this instance pressure, force or some mechanical displacement measured directly or as the result of a force being measured acting upon the bellow. As can be seen from the diagram, this version of the device includes a bellow in the construction as a pressure summing element, displacement transducer, or force transducer. This is the "reactive element" referred to earlier.

Figure 5:
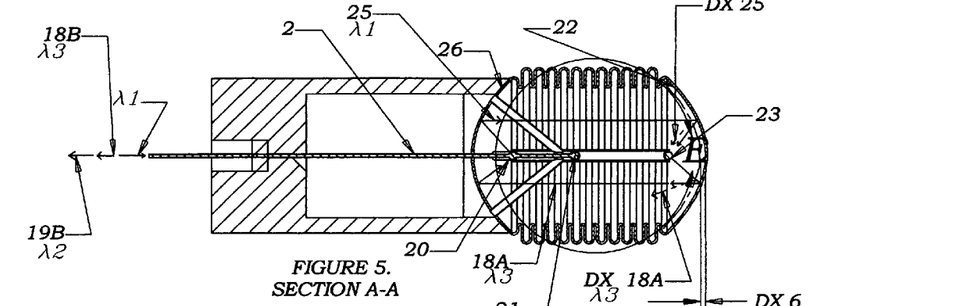
FIG. 5 shows a cut away view of FIG. 4
Figure 6:
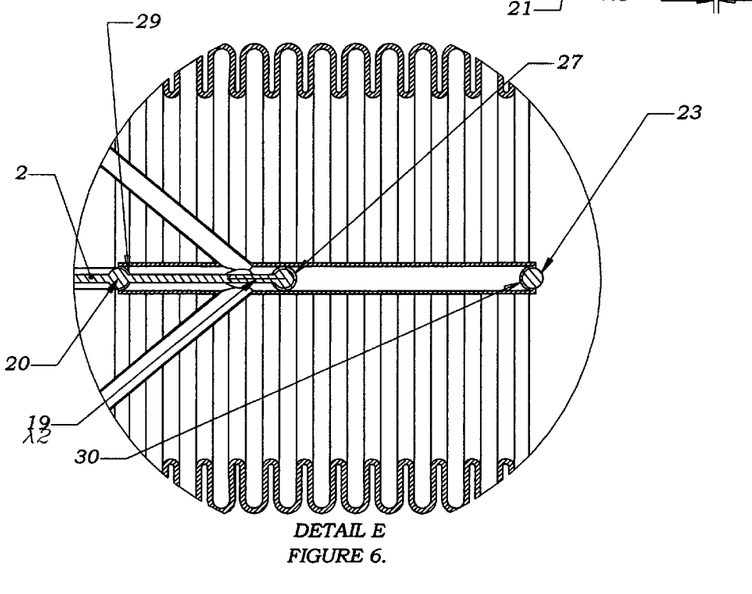
FIG. 6 shows a close up view of DETAIL E of FIG. 5

FIG. 5 shows the invention in cut-away to reveal the internal construction. This device is configured to use the focusing/defocusing effect encountered in moving a curved mirror as described in Coleman U.S. Pat. No. 6,604,427. In FIG. 5, the device is seen being energized by incoming light energy represented by ray $\lambda 1$ launched into the optic fiber 42 from the excitation source. This input light continues down the optic fiber 42 encountering ball element 60. This ball element may be doped or treated such that light passing through it is diffused or filtered. At this point, some of the input light $\lambda 1$ exits element 60, in part due to reflection from a coating shown as element 69 in FIG. 6 and some passes through to element 61. This relationship is relatively unaffected by condition of the reactive element, described by DX6. The light energy which exits element 60 then reflects from a mirror element 66 to mirror element 62, At the zero condition, this light is focused onto element 63 which is treated such that light emanating from it by reflection or florescence is of a characteristic wavelength or range of wavelengths, a ray of which is represented by ray 58A of FIG. 5 and which possesses a spectral character: a distinct wavelength(s) or range of wavelengths noted as $\lambda 3$. This signal element 63 may be doped or treated such that light passing through, reflecting, or emitting from it is diffused or filtered by spectral character and may have a reflective coating, and/or layers of florescent and reflective coatings and/or wavelength selective filtering shown as 70 in FIG. 6 such that light emanating from element 63 will be of a characteristic wavelength or spectral character. Note that this coating may extend to the entire surface of element 63 or only to the half spherical surface shown depending whether it is constructed as a filtering, florescent, or reflective element. Ray 58A, which is generated by or reflected from element 63 is then reflected off mirror element 62, which is constructed to aim the beam to mirror element 66, which is constructed to focus such a ray into element 60 resulting in light of the said characteristic wavelength $\lambda 3$ launched as return signal 58B into optic fiber 42 in the direction of the reader device. It can be seen that if mirror element 62 is moved some distance such as represented by DX 6 from it's zero condition location, as shown in FIG. 5, then the focal point of said mirror is also moved away from signal element 63. The result is less excitation light of ray 65 from element 60 reaching signal element 63, represented by ray DX 65 and thus less response in the form of light represented by DX58A emanating from signal element 63. Of this reduced emission, less reaches element 60 since less of this emission is aimed such that it will reach element 60, compounding the effect of reducing the light energy to be found in return light ray 58B. This is the "signal channel" that will be received at the reader device. FIG. 5 shows the ray DX 65 "missing the target" of element 63, and similarly, ray DX 58A is shown on a course to "miss the target" of element 60 with the effect of reducing the amount of light energy of characteristic wavelength $\lambda 3$ to the reader. This comprises the "signal channel". The portion of excitation light $\lambda 1$ entering the transducer and passing through element 60 continues to reference element 61, where it serves to excite the reference channel. The reference element may be doped or coated such that it emits via reflection or florescence a light of spectral character $\lambda 2$. Note that the conditions the device is adapted to measure via deformation DX6 does not affect the production of 22 shown in ray 59 in FIG. 6, much of which passes through element 60 and propagates along optic fiber 42 as ray 59B. This is relatively unaffected by the condition being measured and comprises the "reference channel".

Figure 14:
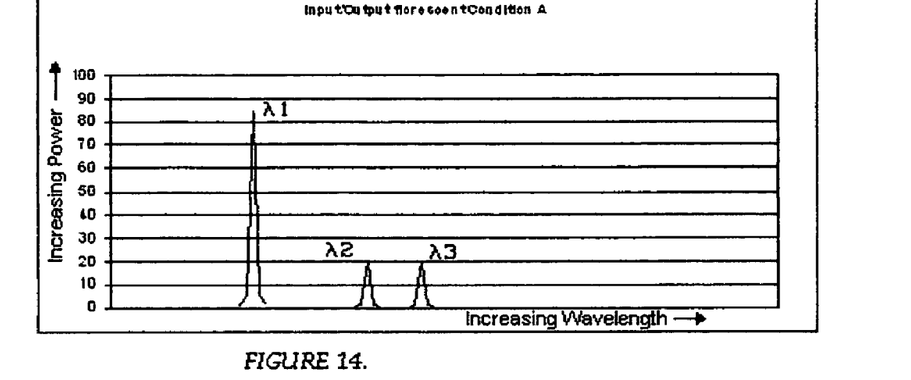
FIG. 14 shows an example of typical input and output on a graph of power VS wavelength in some condition.
Figure 15:
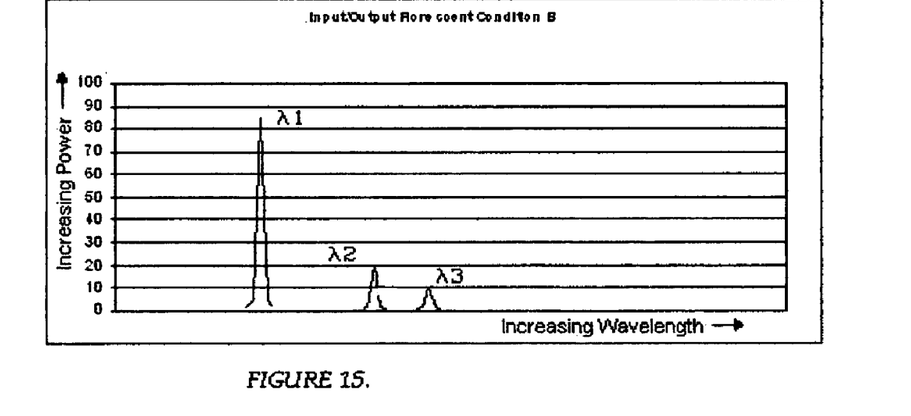
FIG. 15 shows an example of typical input and output on a graph of power VS wavelength in some condition different from the preceding FIG. 14.

The output results would be substantially similar to the proceeding example depicted in FIG. 14 and FIG. 15. The earlier note concerning reflective VS florescent devices also applies: for reflective devices, $\lambda 1$ must contain wavelength components equal to $\lambda 2$ and $\lambda 3$ whereas florescent devices need only contain the wavelength required to excite the florescent media though other wavelengths may be present as well.

Figure 7:
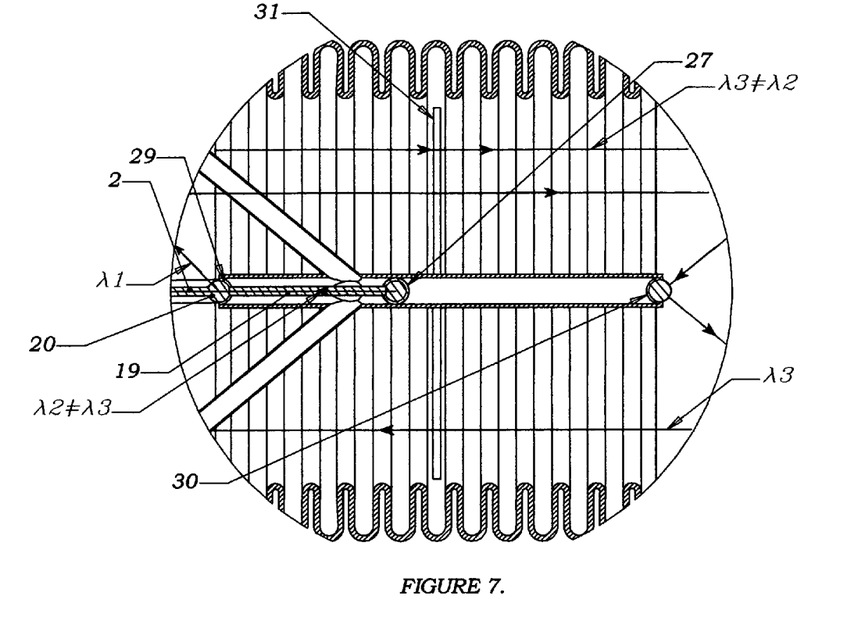
FIG. 7 shows an embodiment of the device using optic filters to create light signals of two different spectral characters

FIG. 7 depicts an embodiment of the present invention which separates the incoming light excitation light λ1 into components λ2 and λ3 using filters 59 and 71.

Figure 8:
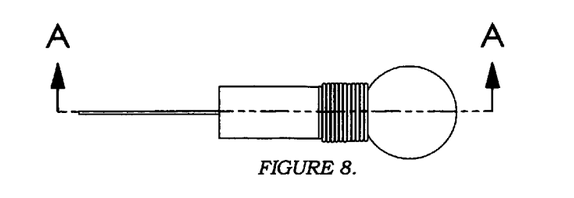
FIG. 8 shows an embodiment of the device employing a prism and spherical reflector to separate incoming light into signals of different spectral character for differential attenuation.

FIG. 8 depicts the system using a prism 71 to separate the incoming light into a reference and signal channel.

Figure 9:
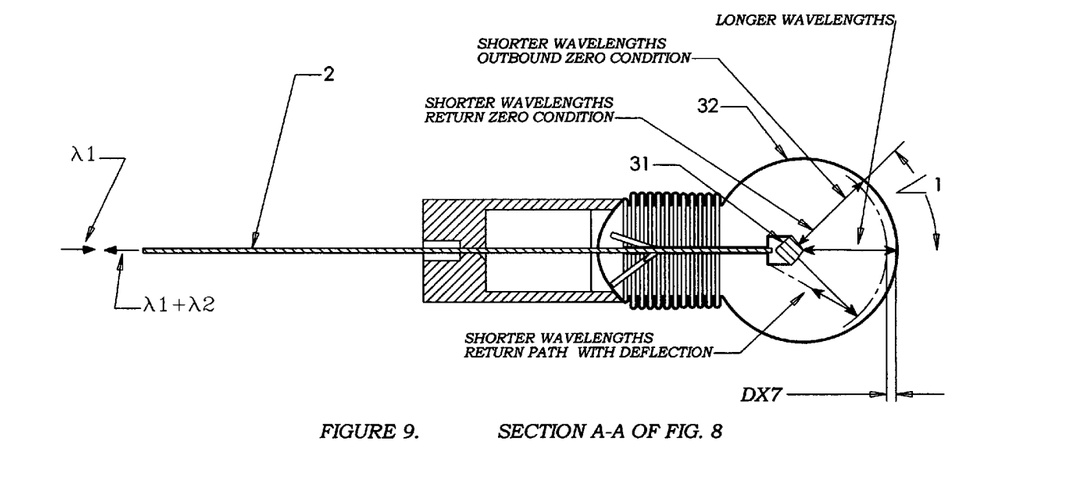
FIG. 9 shows a cutaway of FIG. 8.

FIG. 9 is a cutaway view of the device depicted in FIG. 8. As the incoming excitation light λ1 enters the transducer after propagating along fiber optic 42, it encounters a prism, causing the shorter wavelength components of λ1 to deviate more from the original path than the longer wavelengths at some angel shown as ∠1. Shorter wavelengths will take a path with a greater ∠1. At the zero condition, longer and shorter wavelength rays are both substantially reflected off the spheroid surface 72 back into the prism 71 and re-launched back into the optic fiber 42 to propagate along the fiber to the meter or resolver to be translated into a pressure, force, or displacement reading as in FIG. 1 or a mechanical motion as described in FIG. 2. As can be seen FIG. 9, at the zero condition all waves emanate from the effective center of a sphere, thus striking the reflective surface of 72 at an effective perpendicular. As the spheroid surface 72 is displaced by the quantity being measured or the control input, the shorter wavelength rays will not be reflected back to the prism, as is shown here. The shorter wavelengths will thus tend to miss the re-entry target and not be present in the return signal to a greater extent than the longer wavelengths, which will be less affected by this deflection since they will strike a more nearly perpendicular surface that is less disturbed from it's original angle to the beam of light emanating from the prism. This change in spectral character of the returning light is predictable with deflection DX7 and can be used to measure such a deflection.

Figure 16:
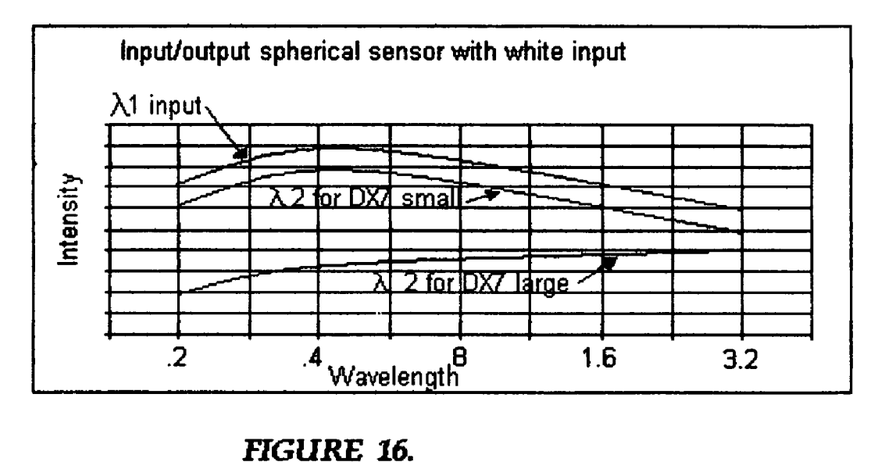
FIG. 16 shows an example of typical input and output of light on a graph of power VS wavelength for a spherical reflector device using a prism to separate "white" excitation light into component wavelengths.

FIG. 16 shows a typical graph of anticipated input/output power VS wavelength for a system using multiple component light, such as generated by an incandescent bulb. λ1 is launched into the optic fiber. This chart assumes both that the fiber carries components of light from approximately 0.2 to approximately 3.2 microns in wavelength and the source generates something akin to incandescent light similar to a Planck distribution of radiation from a hot black-body for the purposes of the illustration. In this case, for the zero condition (ie the reflector is substantially undisturbed, DX7=effectively zero) the returning signal light λ2, though lower in power than the excitation light due to unavoidable real world losses such as attenuation by the fiber and losses from connections, contains effectively the same mix of wavelengths as λ1. This is illustrated by the power VS wavelength curve labeled "λ2 for DX small". When DX7 is increased, shorter wavelengths are lost from the mix of returning signal light, changing it's spectral character as illustrated by the curve labeled "λ2 for DX large".

Figure 17:
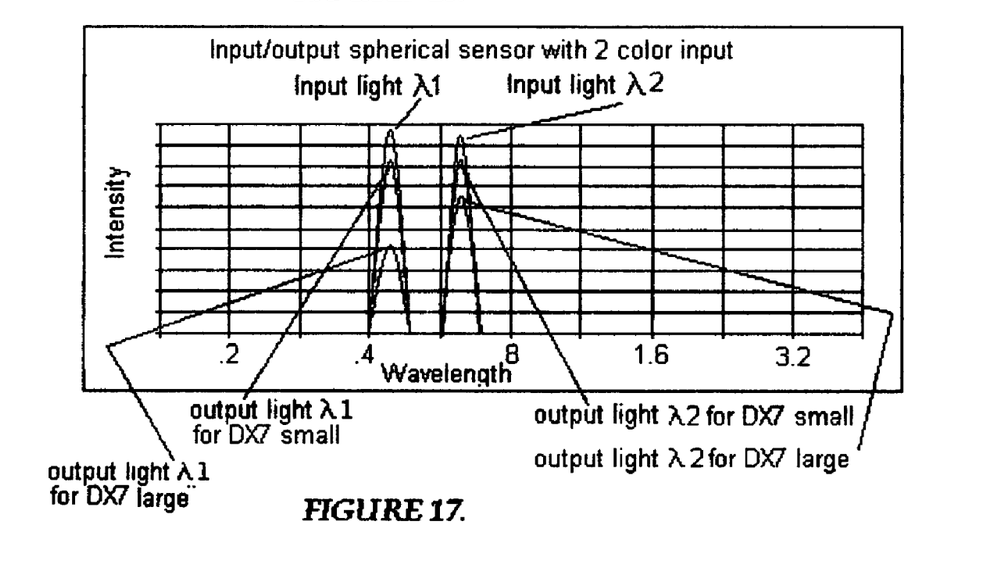
FIG. 17 shows an example of typical input and output of light on a graph of power VS wavelength for a spherical reflector device using a prism to separate multi-wavelength excitation light into component wavelengths.

The same mechanism also may be employed using two or more distinct ranges of wavelengths or two or more monochromatic inputs or inputs along narrow bands as illustrated by FIG. 17. In this application, λ1 and λ2 refer to two different wavelengths of light, whether input or output light. In this case, output light of both wavelengths are decreased in power from input levels, however the shorter wavelength λ1 in the return light is affected to a greater degree as DX7 is increased.

Figure 10:
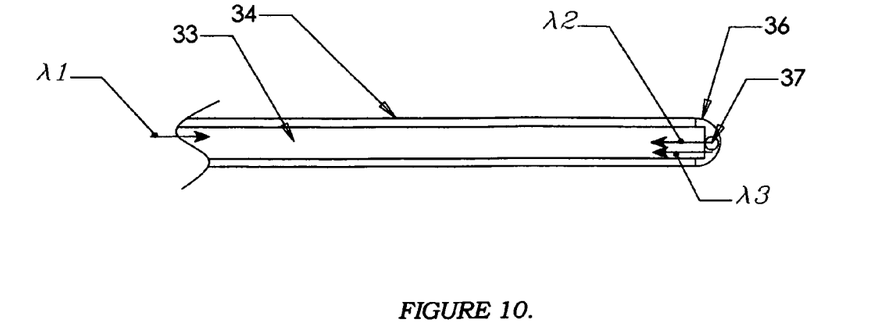
FIG. 10 shows an embodiment of the invention constructed as a chemical state sensor.

FIG. 10 depicts the system configured to sense a chemical condition. In this configuration an excitation light λ1 is launched into the optic fiber. Upon reaching the distal end of the fiber, some of the excitation light strikes sensor element 76, and some strikes reference element 77. Both elements possess florescent properties and thus respond by emitting light at some characteristic wavelength λ3 for the signal from the sensor, and a different wavelength λ2 for the reference. In this construction, the sensor element 76 is exposed to the chemical condition being measured, directly or through a permeable membrane. The florescent reference element 77 is constructed such that it is not affected by the chemistry being measured, so it's response to incoming light λ1 is predominantly a function of how much excitation light reaches it. Secondarily, other phenomena that may serve to affect light output such as temperature, pressure, etc would act upon both florescent media to the substantially same amount. One of the florescent media would be constructed to be sensitive to the intended quantity to be measured. The "quenching" effect of certain chemical conditions (or lack thereof) such as Ph, or dissolved gasses in liquids such as concentration of Oxygen in blood on the amount of output light emitted by florescent media are known. Signal element 76 is constructed such that it's florescent response in the form of λ3 is a function not only of the excitation light received, as is reference element 77, but of the chemical condition being measured. As the chemical condition changes, other factors being equal, the amount of reference light λ2 will not vary. Both elements 76 and 77 are constructed such that significant variables such as the amount of light received affect both elements in a similar or predictable manner. The characteristics of the optic fiber and the emission wavelengths are chosen such that they are affected similarly by physical phenomena that would attenuate signal such that both λ2 and λ3 are affected similarly by phenomena other than the quantity being measured. The chemical condition can then be determined by comparing the intensity ratio of λ2:λ3 at the meter.

Figure 11:
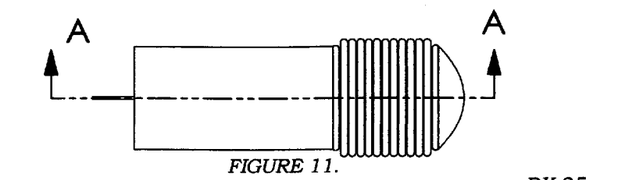
FIG. 11 shows an embodiment of the invention constructed to discriminate signal from reference by timing methods
Figure 12:
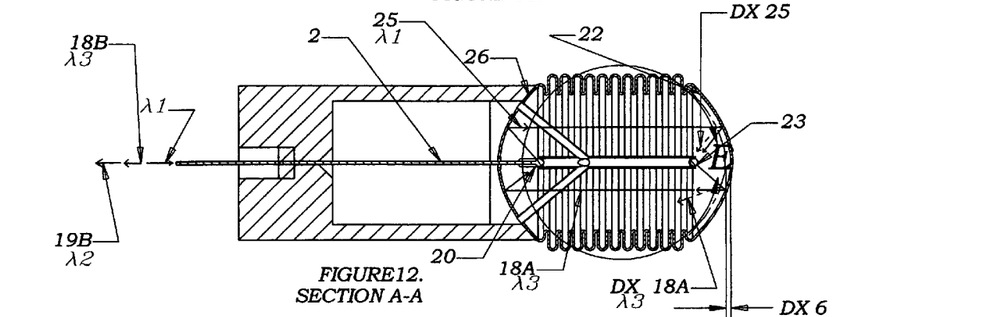
FIG. 12 shows a cut-away view of FIG. 11
Figure 13:
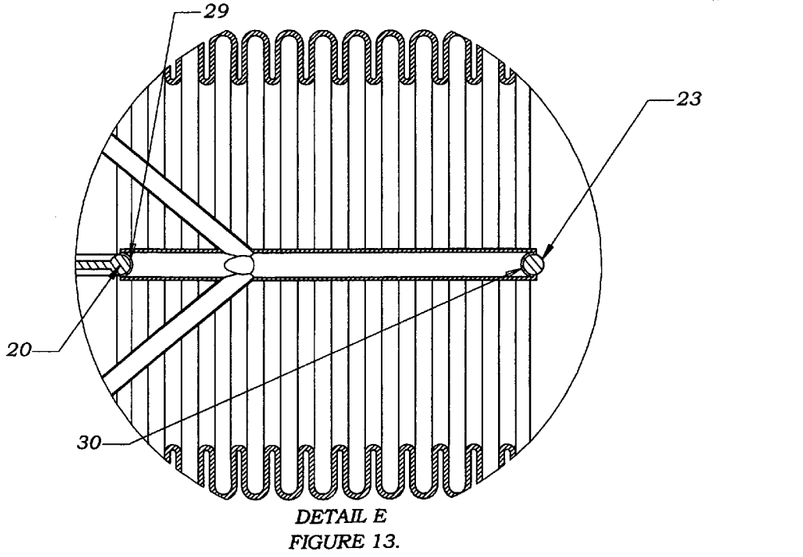
FIG. 13 shows a close up view of DETAIL E of FIG. 12

FIG. 11 shows an embodiment of the device constructed to discriminate the signal (λ3) from reference (λ2) by timing methods. This is shown in cut-away and close-up in FIG. 5 and FIG. 6 respectively. This series of illustration is intentionally made similar to FIGS. 4 thru 6. In this case of timing discrimination, the reference generating element 61 is not required. The reference channel will emanate from element 60 in this case. Element 60 may be doped or treated to diffuse light passing through it. The excitation light λ1 would be generated as a short pulse. The reference channel would be the light, which reflects directly off the reflector element 69 and back to the meter or resolver as illustrated in FIGS. 1 and 2. This would comprise reference channel λ2. Some of the light input as λ1 will, upon reaching reflector element 69, be reflected out of element 60 to take a course to reflect from elements 66, 62, and 63 with the same effects of attenuation of the returning light pulse due to deflection of the mirror element 62 by some DX6 as previously described for FIG. 4, FIG. 5 and FIG. 6. This happens independently of λ2, which is already on it's way to the meter or resolver at that point in time. With λ1 generated as a sufficiently short duration pulse, there will be two distinct return pulses, the first of which is not strongly affected by DX6, and a second which is strongly affected by DX6. The condition of DX6 can then be measured as in the wavelength discrimination systems as a ratio λ2:λ3.

Those skilled in the art will appreciate that various adaptations and modifications of the just-described preferred embodiment can be configured without departing from the scope and spirit of the invention. Therefore, it is to be understood that, within the scope of the appended claims the invention may be practiced other than as specifically described herein.

What is claimed is:

1. A communication system for an optic type sensor comprising:
    (a) a transducer which receives an input light signal and returns an output light signal comprising two or more distinct components at least one of which changes predictably in relation to a pressure, force, or displacement acting upon a focusing reflective and or focusing transparent element of the transducer, wherein the characteristics of at least one component of the output light signal is affected in a different manner by the pressure, force or displacement acting on the transducer than the other component or components of the output light signal;

(b) an input light signal;

(c) a single strand optic fiber which conducts the input light signal from the light source into the transducer and returns a modified light signal along the same single strand optic fiber;

(d) a light splitter located along the single strand optic fiber, between the light source and the transducer, which causes a portion of the returning output light signal to be transmitted into a separate communication channel;

(e) a reader device which receives the returning output light signal spilt off by the light splitter and decodes it into a pressure, force or displacement reading;

(f) a communication channel between the light splitter and the reader device.

2. The communication system of claim 1 wherein the communication channel between the light splitter and the reader device comprises a single strand fiber optic cable.

3. The communication system of claim 1 wherein the communication channel between the light splitter and the reader device comprises a space gap.

4. The communication system of claim 3 wherein there are two or more optic paths, one or more propagating the input or excitation light signal to the transducer and one or more propagating the output or signal light to a reader device without a light splitter.

5. The communication system of claim 3 wherein the output light signal emitted by the transducer further comprises light of two or more different wavelengths emitted at substantially the same time, and in which the ratio of energy emitted by the transducer in these different wavelengths changes predictably with pressure, force or displacement acting on the transducer.

6. The communication system of claim 3 wherein the input and output light signals are further comprised of a signal pulse and a reference pulse which are distinguished by the time of their arrival at the reader device substantially along a single path between the transducer and the reader device;
where the quantity being measured is determined by comparing the energy present in the different pulses which are affected differently by pressure, force or displacement acting upon the transducer;
where the reference pulse arrives at the reader device proximate in time with the signal pulse;
where a time gap occurs between the reference pulse and the signal pulse;
where the wavelength of the signal pulse and the wavelength of the reference pulse are not determinative of signal differentiation; and
where the signal pulse and the reference pulse travel substantially along the single path.

7. The communication system of claim 3 wherein the transducer separates input light energy into its components by wavelength and preferentially attenuates either longer or shorter wavelengths being reflected back to the reader device in a predictable manner based on the pressure, force or displacement acting upon the transducer.

8. The communication system of claim 3 wherein the input energy is used to generate light by fluorescence.

9. The communication system of claim 1 further comprising a curved reflector positioned to focus light to a point within the transducer.

10. The communication system of claim 1 further comprising a lens to focus light to a point within the transducer.

11. The communication system of claim 3 wherein the transducer is an assembly further comprising a base, a non-rigid spheroid structure with an interior reflective surface extending from said base, and a housing assembly within said spheroid assembly mounting a prism at the at rest focal center of the spheroid structure with said mounting assembly also configured to fix an optic fiber in place so as to direct light transmitted through said optic fiber into said prism and to receive light returned back through said prism.

12. The communication system of claim 3 wherein the transducer is an assembly further comprising a base, a rigid spheroid structure with an interior reflective surface, a flexible assembly connecting said base to said spheroid structure, and a housing assembly fixed in position to said base and positioned within said spheroid assembly and mounting a prism at the at rest focal center of the spheroid structure with said housing assembly also configured to fix an optic fiber in place so as to direct light transmitted through said optic fiber into said prism and to receive light returned back through said prism.

13. The communication system of claim 3 wherein the transducer is a bellow or diaphragm assembly further comprising a filter to separate signal and reference light by wavelength.

14. The communication system of claim 3 wherein the transducer is a bellow or diaphragm assembly further comprising more than one optic paths of differing length such that the light propagating along one path would be affected differently by the quantity of pressure, force or displacement, being measured than the light propagating along any other path.

15. The communication system of claim 3, further comprising: a pneumatic tire, an optic fiber, and a port on the rim of the assembly to which the tire is substantially removably attached, where a signal light is capable of being emitted through the port.

16. The communication system of claim 3 configured to measure a physical quantity of a component of rotating machinery.

17. The communication system of claim 3 wherein the sensor is a transducer configured to detect control inputs made by a system operator and communicate said inputs to the components being operated by said system operator.

18. A communication system for a chemical sensor comprising:

(a) a transducer which receives an input light signal and emits an emitted light due to fluorescence with certain characteristics which change predictably with chemical composition acting on transducer, with at least one of the characteristics of emitted light affected in a different manner than the other characteristics by said chemical composition acting on the exterior surface of the transducer.

(b) a source of light inputted into a single strand optic fiber;

(c) a single strand optic fiber which conducts the input light signal from the light source into the transducer and returns a modified light signal along the same single strand optic fiber;

(d) a light splitter located along the single strand optic fiber, between the light source and the transducer, which causes a portion of the returning output light signal to be transmitted into a separate communication channel;

(e) a reader device which receives the returning output light signal spilt off by the light splitter and decodes it into a chemical state reading;

(f) a communication channel between the light splitter and the reader device;

(g) where a fluorescent element changes fluorescent properties with chemical exposure comprising a fluorescent signal channel;

(h) where a reference channel comprising a fluorescent elements is affected minimally from the fluorescent element, which returns light to the reader device via an optic fiber.

19. The communication system of claim 18 wherein the communication channel between the light splitter and the reader device is a single strand fiber optic cable.

20. The communication system of claim 19 wherein the communication channel between the light splitter and the reader device is a space gap between the transducer and the reader device such as to allow remote line of sight reading over a distance of the emitted signal from the transducer and/or rotation of the transducer relative to the emitter device.

21. The communication system of claim 18 wherein the transducer emits light of two or more different wavelengths at substantially the same time, and the ratio of emitted energy in these different wavelengths changes predictably with chemical condition to which the transducer is exposed to.

22. The communication system of claim 18 wherein the chemical condition being measured is pH.

23. The communication system of claim 18 wherein the chemical condition being measured is the concentration of one substance dissolved into or present in another substance.

24. The communication system of claim 18 wherein the signal light is generated by fluorescence.

25. The communication system of claim 18 wherein the transducer is comprised of one or more fluorescent elements which are strongly affected by the chemical condition being measured and one or more fluorescent elements which are less strongly affected by the chemical condition being measured.

26. The communication system of claim 18 where a chemical dye is reactive to fluorescent light;

where an affected fluorescent element responds at a known wavelength;

where an unaffected fluorescent element is substantially unaffected by the emitted light;

where the emitted light affects a second fluorescent element; and where the intensity of the signal channel corresponding to the second fluorescent element is compared to the reference channel; and where the transducer is made of biocompatible material.

27. The communication system of claim 18 wherein the output or signal light is propagated to the reader device along a separate optic path from the input or excitation light.

28. The communication device of claim 18 wherein the transducer further comprises a chamber with a permeable exterior membrane, with said chamber containing two or more chemical compounds, one of said compounds whose fluorescent response does not change with respect to the chemical state being measured, and one or more of said compounds whose fluorescent response measurable changes with respect to the chemical state being measured.

29. The communication device of claim 18 wherein the transducer further comprises an encapsulated fluorescent material whose fluorescent response does not significantly change when exposed to material being measured, a coating of fluorescent material whose fluorescent response measurably changes with response to the material being measured, with said coating covering and adhering said encapsulated fluorescent material to the end of said single strand optic fiber which conducts the input light signal.

\* \* \* \* \*